United States Patent
Andrassy et al.

(10) Patent No.: US 12,182,682 B2
(45) Date of Patent: Dec. 31, 2024

(54) METHOD FOR RETRIEVING A RECOMMENDATION FROM A KNOWLEDGE DATABASE OF A TICKETING SYSTEM

(71) Applicant: Siemens Aktiengesellschaft, Munich (DE)

(72) Inventors: Bernt Andrassy, Munich (DE); Pankaj Gupta, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 798 days.

(21) Appl. No.: 16/495,243

(22) PCT Filed: Jan. 23, 2018

(86) PCT No.: PCT/EP2018/051520
§ 371 (c)(1),
(2) Date: Sep. 18, 2019

(87) PCT Pub. No.: WO2018/171953
PCT Pub. Date: Sep. 27, 2018

(65) Prior Publication Data
US 2020/0034689 A1 Jan. 30, 2020

(30) Foreign Application Priority Data

Mar. 22, 2017 (IN) .............................. 201711010017
May 8, 2017 (EP) ..................................... 17169904

(51) Int. Cl.
*G06N 3/042* (2023.01)
*G06F 16/2458* (2019.01)
(Continued)

(52) U.S. Cl.
CPC ......... *G06N 3/042* (2023.01); *G06F 16/2462* (2019.01); *G06F 16/252* (2019.01);
(Continued)

(58) Field of Classification Search
CPC .. G06N 3/0427; G06N 3/0436; G06N 3/0445; G06N 3/08; G06F 16/2462;
(Continued)

(56) References Cited

U.S. PATENT DOCUMENTS 9,015,093 B1* 4/2015 Commons ............ G06N 3/0454
706/26
2004/0093328 A1* 5/2004 Damle .................. G06F 16/367
(Continued)

FOREIGN PATENT DOCUMENTS

| CN | 103119617 A | 5/2013 |
|---|---|---|
| EP | 2608138 A1 | 6/2013 |
| WO | 2014035539 A1 | 3/2014 |

OTHER PUBLICATIONS

PCT International Search Report mailed Mar. 21, 2018 and corresponding to PCT International Patent Application filed Jan. 23, 2018.
(Continued)

*Primary Examiner* — Michael N Opsasnick
(74) *Attorney, Agent, or Firm* — Schmeiser, Olsen & Watts, LLP

(57) ABSTRACT

Provided is a ticketing system adapted to retrieve a recommendation from a knowledge database in response to a received query, the ticketing system including a processor adapted to perform semantic similarity learning in textual description pairs by calculating similarity scores for similarities between the received query and tickets stored in the knowledge database of the ticketing system, wherein each textual description pair includes a textual description of the received query and a textual description of a ticket of a plurality of tickets stored in the knowledge database of the ticketing system, wherein the ticket having the maximum similarity score is identified and a solution of the identified
(Continued)

ticket is output as the retrieved recommendation for the received query by the ticketing system.

20 Claims, 4 Drawing Sheets

(51) Int. Cl.
    *G06F 16/25*     (2019.01)
    *G06F 40/30*     (2020.01)
    *G06N 3/043*     (2023.01)
    *G06N 3/044*     (2023.01)
    *G06N 3/08*     (2023.01)
    *G06Q 10/20*     (2023.01)

(52) U.S. Cl.
    CPC ............. *G06F 40/30* (2020.01); *G06N 3/043* (2023.01); *G06N 3/044* (2023.01); *G06N 3/08* (2013.01); *G06Q 10/20* (2013.01)

(58) Field of Classification Search
    CPC ........ G06F 16/252; G06F 40/30; G06F 16/00; G06Q 10/20
    See application file for complete search history.

(56) References Cited

U.S. PATENT DOCUMENTS

| | | | |
|---|---|---|---|
| 2004/0122656 A1* | 6/2004 | Abir | G06N 5/022 704/4 |
| 2007/0061317 A1* | 3/2007 | Ramer | G06F 16/951 |
| 2008/0077570 A1* | 3/2008 | Tang | G06F 16/951 707/999.005 |
| 2011/0276165 A1* | 11/2011 | Ko | G05B 23/0245 700/104 |
| 2012/0030057 A1 | 2/2012 | Daniello et al. | |
| 2012/0173373 A1* | 7/2012 | Soroca | H04W 4/02 705/26.3 |
| 2013/0104236 A1* | 4/2013 | Ray | H04L 63/20 726/25 |
| 2013/0167039 A1 | 6/2013 | Howell et al. | |
| 2014/0067728 A1 | 3/2014 | Green et al. | |
| 2015/0253787 A1 | 9/2015 | Mullin et al. | |
| 2015/0339570 A1* | 11/2015 | Scheffler | G06N 3/04 706/27 |
| 2015/0346706 A1* | 12/2015 | Gendelman | G05B 23/0208 700/79 |
| 2016/0373891 A1* | 12/2016 | Ramer | H04W 4/02 |
| 2017/0060366 A1 | 3/2017 | Alexander et al. | |
| 2017/0109355 A1* | 4/2017 | Li | G06N 7/01 |
| 2019/0195742 A1* | 6/2019 | Erickson | G01M 99/008 |
| 2020/0034689 A1* | 1/2020 | Andrassy | G06N 3/044 |

OTHER PUBLICATIONS

PCT International Search Report and Written Opinion mailed Mar. 21, 2018 and corresponding to PCT International Patent Application PCT/EP2018/051520 filed Jan. 23, 2018.

European Examination Report for Application No. 18704427.6, dated Jul. 3, 2020.

\* cited by examiner

METHOD FOR RETRIEVING A RECOMMENDATION FROM A KNOWLEDGE DATABASE OF A TICKETING SYSTEM

CROSS-REFERENCE TO RELATED APPLICATIONS

This application claims priority to PCT Application No. PCT/EP2018/051520, having a filing date of Jan. 23, 2018, which is based off of EP Application No. 17169904.4, having a filing date of May 8, 2017, and IN Application No. 201711010017, having a filing date of Mar. 22, 2017, the entire contents all of which are hereby incorporated by reference.

FIELD OF TECHNOLOGY

The following relates to a method for retrieving a recommendation from a knowledge database of a ticketing system in response to a received query.

BACKGROUND

Industrial assets such as power plants, production lines, machines, in particular turbines, have to undergo service and/or maintenance procedures to avoid unplanned outages or diminished outputs. Pre-emptive maintenance measures have to be performed to avoid an unwanted outage of an industrial system which can comprise one or several machines. It is an established process to report issues concerning industrial systems to a service provider. These issues comprise descriptions of symptoms which may hint to an operational anomaly of the technical system or its subsystems. This reporting usually leads to textual descriptions of the issue in a ticketing system. The reported issue or query is then investigated by service experts who can evaluate the received query to provide recommended actions or solutions for the reported issue. The recommended actions or solutions are usually attached to the reported issues and form a valuable knowledge database on how to resolve issues concerning the respective technical system or its subsystems. Since industrial assets or systems tend to be similar over various installations and since they do not normally change quickly it can be expected that issues having occurred over various installations may be recurring.

Conventional methods use machine learning and statistical tools such as Latent Dirichlet Allocation for documents clustering and cosine similarity to first learn document topics (representation) in generative and unsupervised paradigm and then the similarity is computed using topical features or latent representations learned. Conventional issue tracking systems propose machine learning based approaches for ticket classification. These issue tracking systems annotate the issue type with a class label which restricts them to predefined classes. Consequently, the conventional issue tracking system is not capable to scale in general application domains. Conventional issue tracking systems are not flexible and cannot be applied to different domain applications. Further, they require a high degree of human intervention to provide solutions for the reported issue.

SUMMARY

Accordingly, an aspect relates to providing a method and a system for retrieving automatically a fitting recommendation from a knowledge database of a ticketing system in response to a received query concerning a technical system or a subsystem.

In some embodiments, the invention provides, according to a first aspect, a method for retrieving a recommendation from a knowledge database of a ticketing system in response to a received query,
the method comprising:
performing a semantic textual similarity learning in textual description pairs by calculating similarity scores for similarities between the received query and tickets stored in the knowledge database,
wherein each textual description pair includes a textual description of the received query and a textual description of a ticket of a plurality of tickets stored in the knowledge database and identifying the ticket having the maximum similarity score and reading a solution of the identified ticket as the retrieved recommendation for the received query.

In a possible embodiment of the method according to the first aspect of embodiments of the present invention, the received query comprises as a textual description at least a subject text and/or a description text.

In a further possible embodiment of the method according to the first aspect of embodiments of the present invention, each ticket stored in the knowledge database comprises as a textual description at least a subject text, a description text and/or a solution text.

In a further possible embodiment of the method according to the first aspect of embodiments of the present invention, for each textual description of the received query and for each textual description of the ticket at least one associated representation is calculated.

In a possible embodiment of the method according to the first aspect of embodiments of the present invention, the representation of the textual description comprises a hidden state of an associated neural network.

In a further possible embodiment of the method according to the first aspect of embodiments of the present invention, the representation of the textual description comprises a word embedding.

In a still further possible embodiment of the method according to the first aspect of embodiments of the present invention, multi-level symmetric representation differences and/or cross-level asymmetric representation differences between the received query and tickets stored in the knowledge database are calculated.

In a further possible embodiment of the method according to the first aspect of embodiments of the present invention, the similarity score indicating a degree of similarity between the received query and a ticket stored in the knowledge database is calculated on the basis of the multi-level symmetric representation differences and/or on the basis of the cross-level asymmetric representation differences using a predetermined similarity metric.

In a further possible embodiment of the method according to the first aspect of embodiments of the present invention, the similarity metric comprises a Manhattan similarity metric.

In a further possible embodiment of the method according to the first aspect of embodiments of the present invention, the representation of the textual description comprises a hidden state of a bidirectional Long Short Term Memory, LSTM, network.

In a further possible embodiment of the method according to the first aspect of embodiments of the present invention, each ticket stored in the knowledge database further comprises a timestamp, metadata, information data and/or control data.

In a still further possible embodiment of the method according to the first aspect of embodiments of the present invention, the query is input by a user.

In a further possible embodiment of the method according to the first aspect of embodiments of the present invention, the query is generated by a controller of a machine in response to a monitored state of the respective machine.

In a still further possible embodiment of the method according to the first aspect of embodiments of the present invention, the solution of the identified ticket read from the knowledge database as the retrieved recommendation for the received query comprises a solution text of the identified ticket for a user and/or control data of the identified ticket which controls the machine automatically.

In a still further possible embodiment of the method according to the first aspect of embodiments of the present invention, the representations of the textual description of a ticket are updated during training of the associated neural networks and precalculated for evaluation in response to a received query.

In some embodiments, the invention provides, according to the second aspect, a ticketing system adapted to retrieve a recommendation from a knowledge database in response to a received query, said ticketing system comprising:
  a processor adapted to perform semantic similarity learning in textual description pairs by calculating similarity scores for similarities between the received query and tickets stored in the knowledge database of said ticketing system,
  wherein each textual description pair includes a textual description of the received query and a textual description of a ticket of a plurality of tickets stored in the knowledge database of said ticketing system,
  wherein the ticket having the maximum similarity score is identified and a solution of the identified ticket is output as the retrieved recommendation for the received query by said ticketing system.

BRIEF DESCRIPTION

Some of the embodiments will be described in detail, with reference to the following figures, wherein like designations denote like members, wherein.

DETAILED DESCRIPTION

Figure 1:
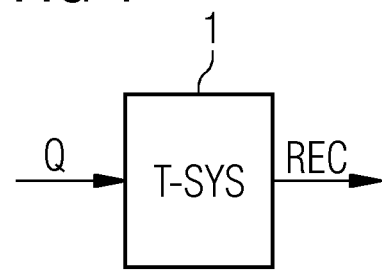
FIG. 1 shows a schematic diagram for illustrating a possible embodiment of a ticketing system according to an aspect of the present invention.
Figure 2:
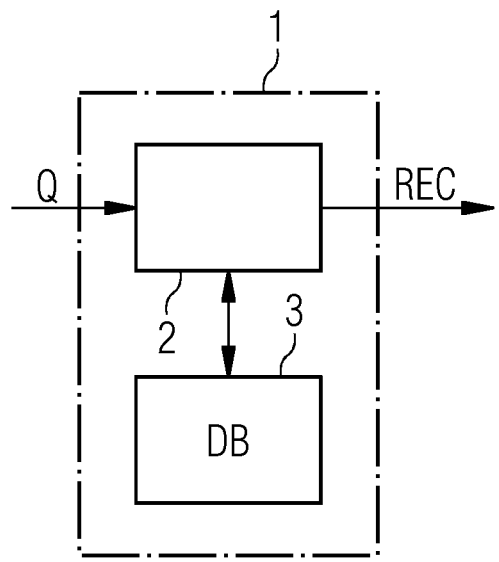
FIG. 2 shows a block diagram of a possible exemplary embodiment of a ticketing system according to an aspect of the present invention.

As can be seen in the schematic diagram of FIG. 1, the ticketing system 1 according to an aspect of embodiments of the present invention is adapted to receive at least one query Q to generate a corresponding recommendation REC for the received query Q. The ticketing system 1 as illustrated in FIG. 1 can form part of an industrial system comprising several industrial assets or machines such as turbines. The ticketing system 1 is adapted to retrieve the recommendation from a knowledge database in response to the received query Q. In a possible embodiment, the ticketing system 1 can comprise a processing unit 2 (which may also be called a processor) adapted to perform semantic similarity learning in textual description pairs by calculating similarity scores for similarities between the received query Q and tickets T stored in the knowledge database 3 of the ticketing system 1 as shown in FIG. 2. Each textual description pair includes a textual description of the received query Q and a textual description of a ticket T of a plurality of tickets stored in the knowledge database 3 of the ticketing system 1. The ticket T having the maximum similarity score is identified and a solution SOL of the identified ticket T is output as a retrieved recommendation REC for the received query Q by said ticketing system 1.

FIG. 2 shows a block diagram of a possible exemplary embodiment of a ticketing system 1 according to an aspect of embodiments of the present invention. In the illustrated embodiment of FIG. 2, the ticketing system 1 comprises a processing unit 2 and a knowledge database 3. The processing unit 2 has access to the database 3 as shown in FIG. 2. The ticketing system 1 comprises an input interface to receive a query Q and an output interface to output the calculated recommendation REC. The processing unit 2 is adapted to perform semantic similarity learning in textual description pairs by calculating similarity scores for similarities between the received query Q and tickets stored in the knowledge database 3 of the ticketing system 1.

Figure 3:
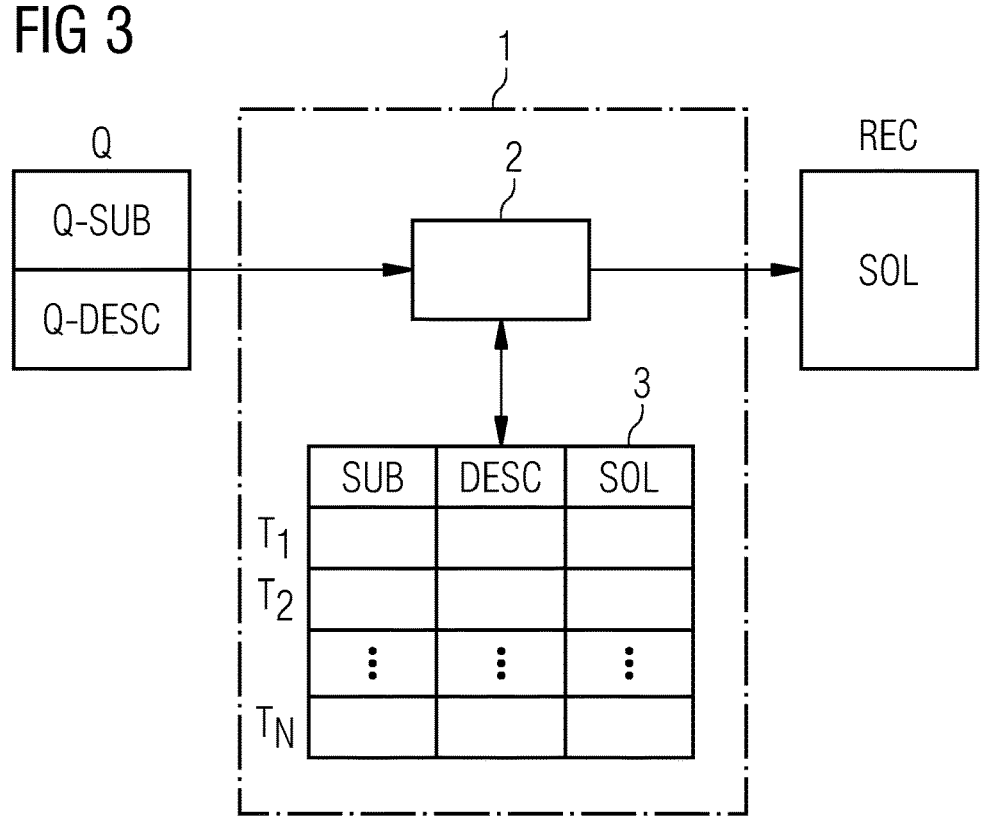
FIG. 3 shows a further schematic block diagram for illustrating a possible exemplary embodiment of a ticketing system according to an aspect of the present invention.

FIG. 3 shows a further block diagram for illustrating an exemplary embodiment of the ticketing system 1 according to an aspect of embodiments of the present invention. In the illustrated exemplary embodiment, the query Q comprises as a textual description at least a subject text Q-SUB and/or a description text Q-DESC as shown in FIG. 3. Each ticket T stored in the knowledge database 3 comprises in the illustrated embodiment as a textual description at least a subject text (SUB), a description text (DESC) and/or a solution text (SOL). The number of tickets T within the knowledge database 3 can vary depending on the use case. The processing unit 2 of the ticketing system 1 is configured to perform semantic similarity learning in textual description pairs by calculating similarity scores y for similarities between the received query Q and the tickets T stored in the knowledge database 3 of the ticketing system 1. Each textual description pair includes, in an exemplary embodiment, a textual description of the received query Q and a textual description of a ticket T within the knowledge database 3. The ticket T within the knowledge database 3 having the maximum calculated similarity score is identified and its associated solution is output as a retrieved recommendation for the received query Q by the ticketing system 1 as also illustrated in FIG. 3.

In the illustrated example of FIG. 3, the received query comprises a subject text Q-SUB and a description text Q-DESC. Further, each ticket T stored in the knowledge database 3 comprises a subject text SUB, a description text DESC and a solution text SOL.

For each textual description of the received query Q and for each textual description of the ticket T at least one associated representation is calculated.

In a possible embodiment, the calculated representation of the textual description comprises a hidden state of an associated neural network. This neural network can comprise a recurrent neural network RNN. In a possible implementation, the neural network can comprise a bidirectional Long Short Term Memory, LSTM, network. In a further possible embodiment, the representation of the textual description can comprise a word embedding E. The number of representations for each textual description can vary. In a possible embodiment, the representations calculated for a textual description can comprise a hidden state h of an associated neural network and/or a word embedding E.

In a possible embodiment of the ticketing system 1 as illustrated in FIGS. 2, 3, the processing unit 2 of the ticketing system 1 can be adapted to calculate multi-level symmetric representation differences and/or cross-level asymmetric representation differences between the representations of the textual descriptions within the received query Q and the representations of the respective ticket T stored in the knowledge database 3 of the ticketing system 1. The similarity score y indicated in a degree of similarity between a query Q and a ticket T stored in the knowledge database 3 is calculated in an exemplary embodiment on the basis of the multi-level symmetric representation differences and/or on the basis of the cross-level asymmetric representation differences using a predetermined similarity metric. In a possible implementation of the ticketing system 1, the similarity metric comprises a Manhattan similarity metric.

In a further possible embodiment, a ticket T stored in the knowledge database 3 of the ticketing system 1 can further comprise a timestamp, metadata, information data and/or control data.

In a possible embodiment, a query Q can be input by a user or a technician by means of a user interface of the ticketing system 1. In a further possible embodiment, the query Q can also be generated by a controller of a machine in response to a monitored state of the machine and supplied to the ticketing system 1 via a logical data network.

In a further possible embodiment of the ticketing system 1, the solution SOL of the identified ticket T read from the knowledge database 3 as the retrieved recommendation REC for the received query Q can comprise a solution text of the identified ticket output to a user or a technician and/or control data of the identified ticket T which can be used to control the machine having caused the query Q automatically.

The representation of the textual descriptions of a ticket T stored in the knowledge database 3 can be updated during training of the associated neural networks and precalculated for evaluation in response to a received query Q.

Figure 4:
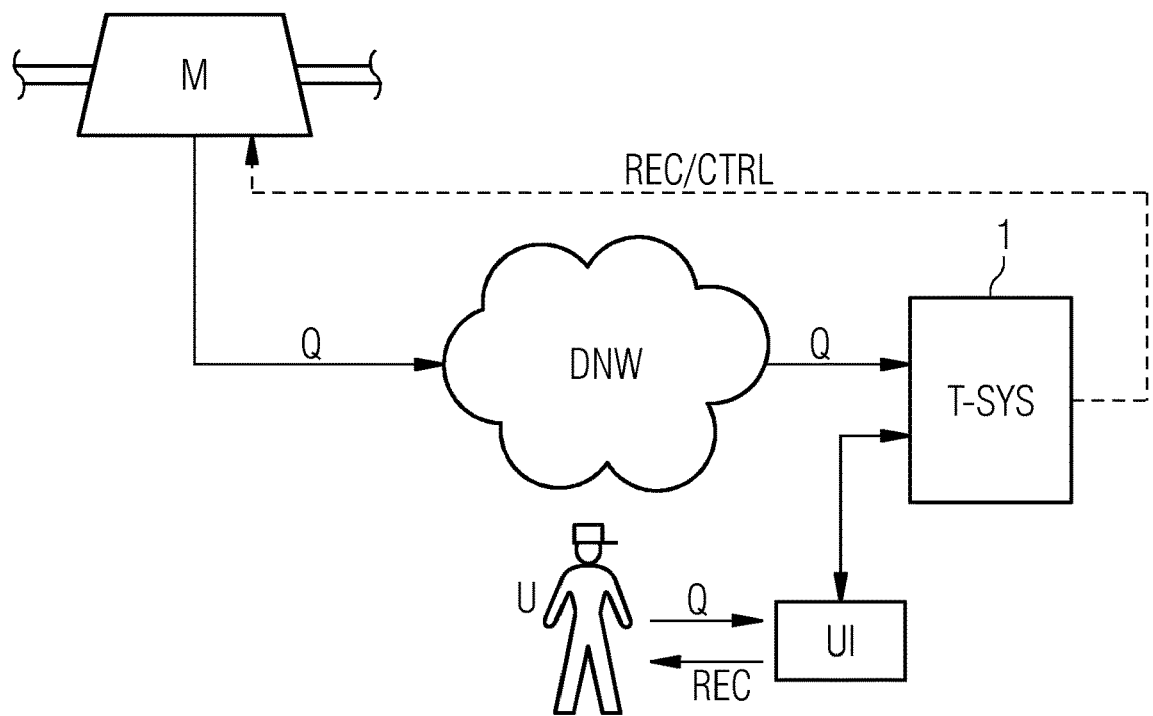
FIG. 4 shows a block diagram of a possible exemplary embodiment of an industrial system using a ticketing system according to the present invention.

FIG. 4 shows a schematic block diagram of a possible exemplary embodiment of a technical system using the ticketing system 1 according to an aspect of embodiments of the present invention. The ticketing system 1 can be used for support and/or maintenance of a machine M as illustrated in FIG. 4. The machine M may, for instance, be a turbine consisting of many subsystems and/or components. In a possible embodiment, a user U, such as a technician, can input via a user interface UI a query Q supplied to the ticketing system 1 for retrieving a recommendation REC. Further, in a possible embodiment, the query Q can also be provided by the machine itself.

In a possible implementation, the internal states of the machine M are monitored and queries Q concerning issues or an abnormal behaviour of the machine M are generated automatically depending on the monitored state of the machine M. The generated query Q can be supplied by the machine M for instance via a data network DNW to an input interface of the ticketing system 1 as illustrated in FIG. 4. The generated query Q can comprise in a possible implementation also a timestamp when the query Q was generated and/or metadata. The metadata may comprise additional information about the respective machine M or machine type. Further, the query Q can include additional information data such as sensor data.

The ticketing system 1 receives the query Q from the machine M or from the user interface UI to retrieve a recommendation REC from a knowledge database 3 in response to a received query Q. In a possible embodiment, the solution of the identified ticket T read from the knowledge database 3 as the retrieved recommendation REC for the received query Q can comprise a solution text of the identified ticket for a user or a technician but also in a possible embodiment control data CTRL of the identified ticket T which can be used to control the machine M automatically, in particular to address the reported issue. For instance, the recommendation REC can comprise control data CTRL to switch off automatically a subsystem or component of the machine M. The solution text can be output via a display to a user or a technician and can include a recommendation for the user how to handle the reported issue and may optionally also inform him of any automatic action performed by the ticketing system 1 in response to the received query Q.

Figure 5:
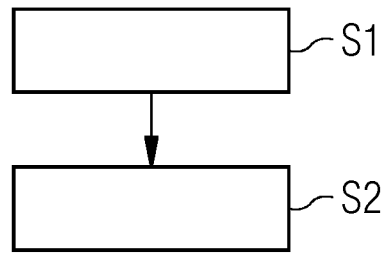
FIG. 5 shows a flowchart of a possible exemplary embodiment of a method for retrieving a recommendation from a knowledge database of a ticketing system according to a further aspect of the present invention.

FIG. 5 shows a flowchart of a possible exemplary embodiment of a method for retrieving a recommendation from a knowledge database 3 of a ticketing system 1 in response to a received query Q. In the illustrated exemplary embodiment, the method comprises two main steps.

In a first step S1, a semantic textual similarity learning is performed in textual description pairs by calculating similarity scores y for similarities between a received query Q and tickets T stored in a knowledge database 3. Each description pair includes a textual description of the received query Q and a textual description of a ticket T of a plurality of tickets stores in the knowledge database 3.

In a further step S2, the ticket T having the maximum similarity score is identified and a solution SOL of the identified ticket is read from the knowledge database 3 as the retrieved recommendation REC for the received query Q.

As illustrated, the query Q, i.e. the reported issue, can consist of a subject Q-SUB and a description Q-DESC. The subject Q-SUB normally comprises several words w. In contrast, the description Q-DESC comprises in a possible embodiment a sequence of sentences each consisting of a set of words. Each ticket T stored in the knowledge database 3 of the ticketing system 1 consists of a subject, description and a solution as illustrated in FIG. 3. The ticketing system 1 is used to retrieve an optimal action or solution for a reported issue. The ticketing system 1 is able to provide a recommendation REC even if different end users describe the reported issue in a subject and/or description in their individual human language. The statements or textual descriptions included in different queries Q or included in the plurality of tickets T stored in the knowledge database 3 may be completely different in language structure and lexical word sets. The ticketing system 1 according to embodiments of the present invention is robust against a different human language used by a plurality of users for different reported issues. The ticketing system 1 achieves this by semantic similarity learning between text pairs using neural network architectures to form a highly structured space defining semantic relationships. To provide an improved similarity learning in reported issues and tickets stored in the database to retrieve an optimal solution or recommendation the ticketing system 1 is adapted to calculate multi-level symmetric representation differences and/or cross-level asymmetric representation differences between the representations of the textual descriptions of the received query Q and of the stored tickets T. In a possible embodiment, word embeddings E are generated along with representations or hidden states h of a LSTM network. In a possible embodiment, char-word embeddings are generated using bidirectional LSTM networks for handling technical vocabulary and typos.

Figure 6:
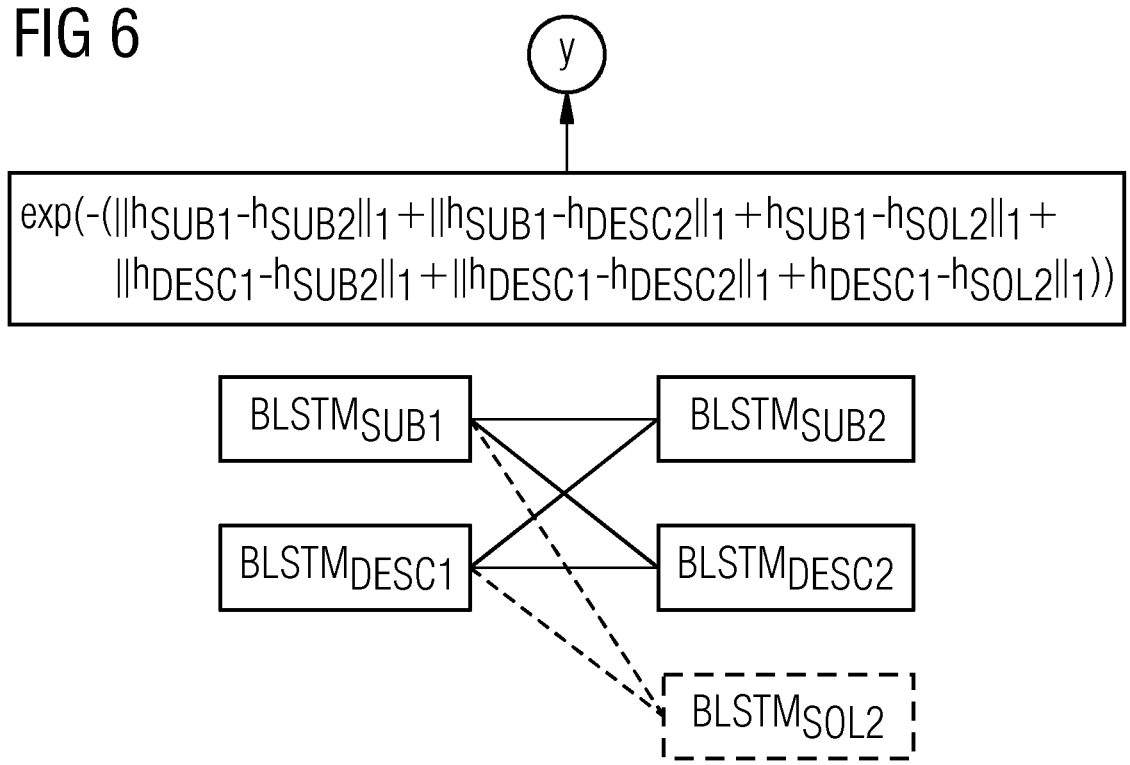
FIG. 6 shows a schematic diagram for illustrating a possible exemplary embodiment of an architecture of an intelligent ticketing system according to an aspect of the present invention.

FIG. 6 shows schematically a possible exemplary embodiment of a ticketing system 1 according to an aspect of embodiments of the present invention using a Siamese bi-directional LSTM neural network architecture. The bidirectional LSTM network is implemented for the subject of the query Q and for the description of the query Q as shown in FIG. 6. Further, bidirectional LSTM neural networks are provided for subject, description and solution of a ticket T within the knowledge database 3. The bidirectional LSTM networks can be used to provide representations for the different textual descriptions of the received query Q and the investigated ticket T. For each textual description of the received query Q and for each textual description of the ticket T, at least one associated representation is calculated using the bidirectional LSTM neural networks shown in FIG. 6. The representation of the textual description can comprise a hidden state h of the associated neural network as well as a word embedding E. As illustrated in the schematic diagram of FIG. 6, the representations provided by the bidirectional LSTM neural networks are supplied to a calculation unit which is configured to calculate a similarity score y for similarities between the received query Q and the ticket T using a predetermined similarity metric. The similarity metric can comprise a Manhattan similarity metric. As shown in FIG. 6, the similarity score y indicating a degree of similarity between the received query Q and the investigated ticket T stored in the knowledge database 3 is calculated on the basis of multi-level symmetric representation differences and on the basis of cross-level asymmetric representation differences using a Manhattan similarity metric.

Figure 7:
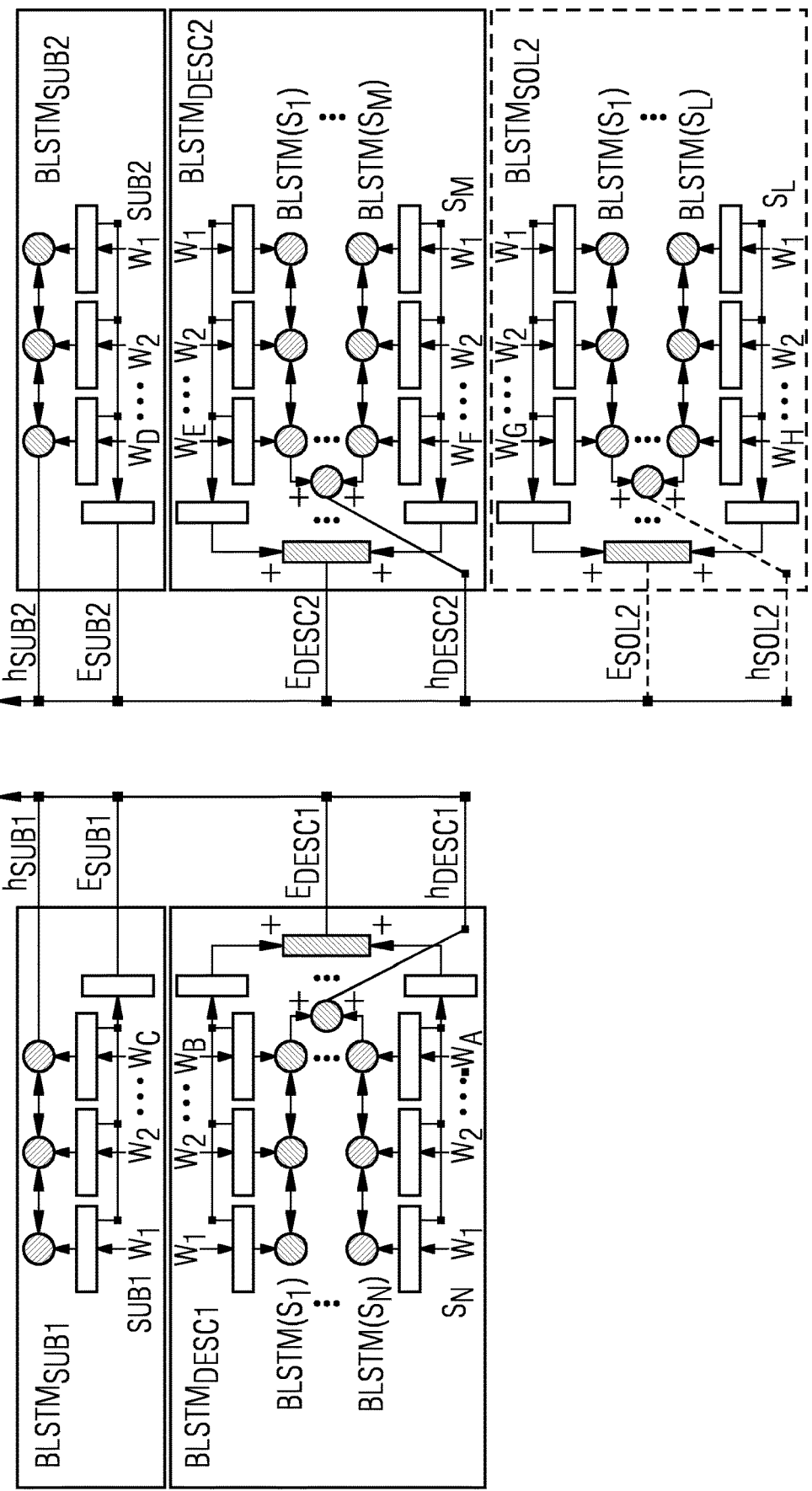
FIG. 7 shows a detailed exemplary architecture of a ticketing system according to an aspect of the present invention.

As can be seen in the detailed architecture illustrated in FIG. 7, the bi-directional LSTM neural network used for the subject of the query Q provides two representations of the subject, i.e. a hidden state representation h of the subject of the query Q and a word embedding $E_{SUBQ}$ of the subject. In a similar way, a corresponding Siamese bidirectional LSTM neural network is used to calculate corresponding presentations of the subject of the investigated ticket T stored in the knowledge database. Accordingly, the BLSTM network used for the subject of the ticket T provides as a first representation a hidden state representation $h_{SUB}$ of the subject and as a second representation a word embedding E of the subject of the ticket T stored in the knowledge database 3.

Further, the system illustrated in FIG. 7 comprises a bidirectional LSTM neural network BLSTM used for the description of the received query Q and another bidirectional LSTM neural network used for the description of the investigated ticket T. Both BLSTM networks used for the description of the query Q and for the description of the investigated ticket T provide two representations including a hidden state representation $h_{DESCQ}$ of the query description and a hidden state representation $h_{DESC}$ of the ticket description. Additionally, corresponding word embeddings E are calculated by the respective bidirectional LSTM neural network. The received query Q does not comprise a solution. In contrast, each ticket T of the tickets stored in the knowledge database 3 comprises a solution SOL. In the illustrated embodiment of FIG. 7, the system comprises a further bidirectional LSTM neural network BLSTM for calculating representations for the ticket solution. The BLSTM neural network calculates in the illustrated embodiment a word embedding $E_{SOL}$ representing the stored solution and a hidden state $h_{SOL}$ of the BLSTM network representing the stored solution SOL of the ticket T. The different representations of the different textual descriptions within the received query Q and of the investigated ticket T are supplied to the calculation unit which calculates different representation differences as illustrated in FIG. 7. For example, a first multi-level representation difference is calculated between the hidden state representation h of the query subject and the hidden state representation h of the ticket subject using a predetermined metric. Further, for example, a cross-level representation difference can be calculated between the hidden state representation h of the subject of the query Q and the hidden state representation h of the description of the investigated ticket T. Representation differences can be calculated on the basis of the hidden state representations h and/or on the basis of the word embedding representations of the different textual descriptions as also illustrated in FIG. 7.

In the illustrated example of FIG. 7, the subject of the query Q and the subject of the investigated ticket T can comprise a set of words w. For each word w a corresponding word vector can be calculated. This word vector can be used for providing the hidden state of the associated bi-directional LSTM neural network. Further, the word vectors can be averaged to calculate the word embedding representation of the subject as shown in FIG. 7.

Further, in the illustrated embodiment of FIG. 7, the description of the query Q and the description of each ticket T stored in the knowledge database 3 comprise a set of sentences S each consisting of a set of words w. For each sentence S of the description, a hidden state is provided by the associated bidirectional LSTM network which forms the basis of the hidden state representation h of the corresponding description. Also, the solution of the ticket T stored in the knowledge database 3 can comprise several sentences S each consisting of a set of words w. For each sentence S of the solution, a hidden state representation h can be provided or calculated and used to derive a hidden state representation h of the complete solution text of the ticket T within the knowledge database 3. The calculation unit calculates a similarity score value y in response to the received query Q for the different tickets T stored in the knowledge database 3 to identify a ticket T within the knowledge database 3 having the maximum calculated similarity score. The solution SOL of this identified ticket T is output by the ticketing system 1 as a recommendation REC for the received query Q. The output recommendation REC can comprise the solution text of the ticket T with the maximum similarity score and in a possible embodiment, additional data, in particular control CTRL data for performing automatically additional actions concerning the reported issue. The ticketing system 1 according to embodiments of the present invention provides an artificial intelligence tool which can generate labelled data pairs with associated similarity scores for any supervised task in order to overcome labelled data scarcity. The ticketing system 1 according to embodiments of the present invention can be applied to any domain for STS and IR tasks. The ticketing system 1 can be used as a recommendation system or question-answering or performing a search in various technical domains. The ticketing system 1 does not require any extensive manual feature generation beyond the separately trained word2vec vectors and larger datasets. The system 1 improves a recall due to introduction of word and char-based embeddings.

In a possible embodiment, the ticketing system 1 use a Siamese LSTM network for multi-level and cross-level or asymmetric textual similarity learning. In a possible embodiment, word embeddings are introduced in similarity learning metrics along with hidden representations from LSTM networks. The ticketing system 1 provides a real-world application of semantic textual similarity learning and retrieving of similar tickets based on a deep learning architecture. It can use char-word embeddings generated via bidirectional LSTM networks for handling technical vocabulary and typos. The ticketing system 1 according to embodiments of the present invention can be used for any kind of industrial system or industrial domain. The system 1 helps in generating additional annotated and supervised or labelled data from a large unsupervised corpus. The ticketing system 1 can reduce human efforts and expert knowledge to manually annotate large corpus required in supervised modelling tasks. The ticketing system 1 according to embodiments of the present invention allows to automate the solution recommendations for query tickets via semantic textual similarity learning. The system 1 helps in empowering similarity learning tools, in particular question and answering tools. The ticketing system 1 according to embodiments of the present invention allows for preemptive maintenance and reduces the probability that a technical system or subsystem may fail during operation. In a possible embodiment, the ticketing system 1 according to embodiments of the present invention can be integrated in a machine M or subsystem for providing automatically recommendations to resolve any kind of abnormal behaviour of a subsystem or a component of the monitored machine M. In a further possible embodiment, several machines M belonging to the same technical system can be connected to a common ticketing system 1 via a data network. In a possible embodiment, the ticketing system 1 is a local ticketing system which can be used for one or several machines M of an industrial plant. In a further possible embodiment, the ticketing system 1 can also comprise a remote system connected to different machines M located on the same or different sites via a data network such as the internet. The ticketing system 1 according to embodiments of the present invention can provide textual recommendations advising users how to resolve a technical problem concerning a machine M. Further, the technical system 1 can also provide control data CTRL and/or control signals helping or supporting the user or technician in solving reported issues concerning a machine. In a possible embodiment, depending whether the recommendation REC provided by the ticketing system 1 was helpful in addressing the reported issue, the generated recommendation REC can be stored in the knowledge database 3 as an additional ticket T for further processing.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatic monitoring and control of a power plant, a production line, or a turbine, the method comprising:
   receiving a query regarding the power plant, the production line or the turbine, wherein internal states of the power plant, the production line or the turbine are monitored and queries concerning an abnormal behavior of the power plant, the production line or the turbine are generated automatically depending on the monitored state of the power plant, the production line or the turbine, wherein the received query comprises as a textual description a description text;
   performing a semantic textual similarity learning in textual description pairs by calculating similarity scores for similarities between the received query and a plurality of tickets stored in a knowledge database,
      wherein each ticket stored in the knowledge database comprises as a textual description a description text and a solution text,
      wherein each textual description pair includes a textual description of the received query and a textual description of each of the tickets of the plurality of tickets stored in said knowledge database; and
   identifying a ticket from the plurality of tickets having the calculated maximum similarity score and reading a solution of the identified ticket as the retrieved recommendation for the received query, wherein the solution of the identified ticket read from the knowledge base as the retrieved recommendation for the received query comprises control data for controlling the power plant, the production line or the turbine; and
   automatically controlling the power plant, the production line or the turbine to address the abnormal behavior of the power plant, the production line or the turbine using the control data of the identified ticket.

2. The method according to claim 1 wherein the received query comprises as a textual description a subject text.

3. The method according to claim 1 wherein each ticket stored in the knowledge database comprises as a textual description a subject text.

4. The method according to claim 1 wherein each ticket stored in the knowledge database further comprises at least one of a timestamp, metadata, information data or control data.

5. The method according to claim 1 wherein the query is input by a user or generated by a controller of the power plant, the production line or the turbine in response to a monitored state of the power plant, the production line or the turbine.

6. The method according to claim 1 wherein the solution of the identified ticket read from the knowledge database as the retrieved recommendation for the received query comprises a solution text of the identified ticket for a user.

7. The method according to claim 1 wherein the representations of the textual description of a ticket are updated during training of associated neural networks and precalculated for evaluation in response to a received query.

8. The method according to claim 1, wherein the query is generated by a controller of the power plant, the production line or the turbine in response to a monitored state of the power plant, the production line or the turbine and provided via a logical data network.

9. The method according to claim 1, wherein the semantic textual similarity learning includes using a Siamese bi-directional Long Short Term Memory (LSTM) neural network architecture for multi-level and cross-level or asymmetric textual similarity learning.

10. The method according to claim 1, wherein the power plant, the production line or the turbine is connected to a local ticketing system used for a plurality of machines in an industrial plant, wherein the knowledge database is located within the local ticketing system.

11. The method according to claim 1, wherein the power plant, the production line or the turbine is connected to a remote ticketing system used for a plurality of machines in different sites connected by a data network, wherein the knowledge database is located within the local ticketing system.

12. The method according to claim 1, further comprising storing the retrieved recommendation in the knowledge base as an additional ticket for further processing.

13. The method according to claim 1 wherein multi-level symmetric representation differences and/or cross-level asymmetric representation differences between the received query and the tickets stored in the knowledge database are calculated.

14. The method according to claim 13 wherein the similarity score indicating a degree of similarity between the received query and a ticket stored in the knowledge database is calculated on the basis of the multi-level symmetric representation differences and/or on the basis of the cross-level asymmetric representation differences using a predetermined similarity metric.

15. The method according to claim 14 wherein the similarity metric comprises a Manhattan similarity metric.

16. The method according to claim 1 wherein for each textual description of the received query and for each textual description of the ticket at least one associated representation is calculated.

17. The method according to claim 16 wherein the representation of the textual description comprises a word embedding.

18. The method according to claim 16 wherein the representation of the textual description comprises a hidden state of an associated neural network.

19. The method according to claim 18 wherein the representation of the textual description comprises a hidden state of a bidirectional Long Short Term Memory, LSTM, network.

20. A ticketing system adapted to retrieve a recommendation from a knowledge database in response to a received query regarding a power plant, a production line or a turbine, wherein the recommendation includes control data for automatically controlling the power plant, the production line or the turbine, said ticketing system comprising:
a processor adapted to perform semantic similarity learning in textual description pairs by calculating similarity scores for similarities between the received query and a plurality of tickets stored in the knowledge database of said ticketing system, wherein each ticket of the plurality of tickets stored in the knowledge database comprises as a textual description a description text and a solution text, and wherein the received query comprises as a textual description a description text, wherein each textual description pair includes the textual description of the received query and the textual description of a ticket of the plurality of tickets stored in the knowledge database of said ticketing system, wherein the ticket having the maximum similarity score is identified and the solution text of the identified ticket is output as the retrieved recommendation for the received query by said ticketing system, wherein internal states of the power plant, the production line or the turbine are monitored and queries concerning an abnormal behavior of the power plant, the production line or the turbine are generated automatically depending on the monitored state of the power plant, the production line or the turbine, and wherein the solution of the identified ticket read from the knowledge base as the retrieved recommendation for the received query comprises control data of the identified ticket which is used to automatically control the power plant, the production line or the turbine to address the abnormal behavior of the power plant, the production line or the turbine.

* * * * *